United States Patent
Uchida

(10) Patent No.: US 6,341,405 B1
(45) Date of Patent: Jan. 29, 2002

(54) CLAMP

(75) Inventor: Yoshimi Uchida, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/435,827

(22) Filed: Nov. 8, 1999

(30) Foreign Application Priority Data

Jan. 19, 1999 (JP) .............................................. 11-010386

(51) Int. Cl.[7] .................................................. F16L 5/00
(52) U.S. Cl. ............................. 16/2.1; 16/2.2; 174/135; 174/19; 174/21 R
(58) Field of Search ....................... 16/2.1, 2.2; 174/19, 174/21 R, 21 CA, 40 CC, 62, 135

(56) References Cited

U.S. PATENT DOCUMENTS

| | | | |
|---|---|---|---|
| 4,272,047 A | * | 6/1981 | Botka |
| 4,839,937 A | * | 6/1989 | Oikawa et al. |
| 4,934,361 A | * | 6/1990 | Michel et al. |
| 5,376,019 A | * | 12/1994 | Shimirak et al. |
| 5,659,924 A | * | 8/1997 | Gildersleeve ................. 16/2.1 |
| 6,064,003 A | * | 5/2000 | Moore et al. |
| 6,133,529 A | * | 10/2000 | Gretz ......................... 174/135 |

OTHER PUBLICATIONS

The Hardness of Metals, D. Tabor, p. 164.*
Admitted Prior Art, Figs. 4A, 6, 7A,7B and 8.*

* cited by examiner

Primary Examiner—Lynne H. Browne
Assistant Examiner—Tomlyne A Malcolm
(74) Attorney, Agent, or Firm—Oliff & Berridge, PLC

(57) ABSTRACT

A clamp that is locked to a body panel by inserting a flexible locking blade portion thereof into an installing hole and utilizing a return of the locking blade portion to an original state thereof when the locking blade portion exceeds the installing hole. The clamp comprises a resinous material having Rockwell hardness at 100 or more and 150 or less and molded by one-piece molding. When the clamp fits on the body panel, a fit-on sound and consciousness of a return of the locking blade portion to the original state are generated. In the clamp, an increase of an insertion force that is generated by increasing a hardness of the clamp is offset by increasing a height of a projection portion with respect to a substrate portion and decreasing an angle of the locking blade portion formed by turning down a front end of the projection portion to decrease a projection amount of the locking blade portion in a lateral direction thereof.

7 Claims, 3 Drawing Sheets

Fig. 4A
(Prior Art)
Fig. 4B
(Prior Art)
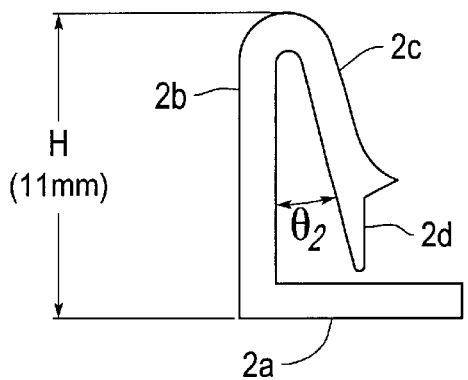
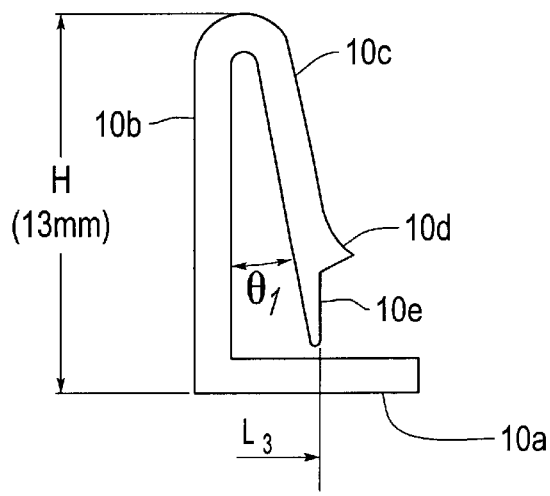
Fig. 5A
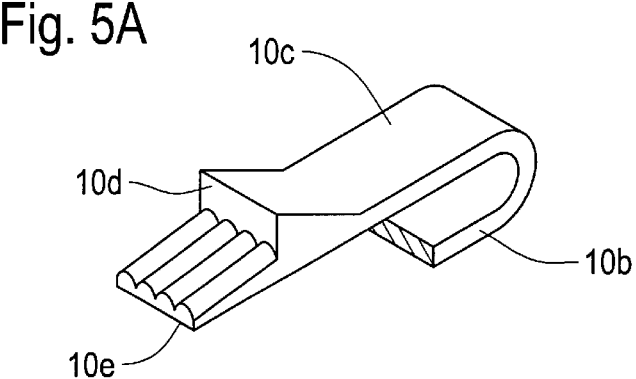
Fig. 5B
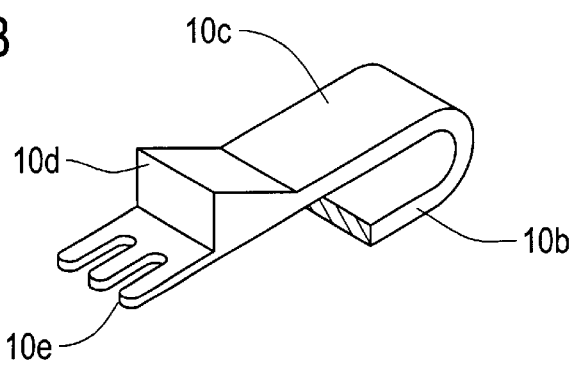

CLAMP

BACKGROUND OF THE INVENTION

1. Field of Invention

The present invention relates to a clamp that is installed on a wire harness that is wired on a vehicle body and inserted fixedly into an installing hole of a body panel. More particularly, the present invention relates to a clamp that clicks when it is installed on the body panel to allow an operator to confirm that the clamp has been installed thereon.

2. Description of Related Art

The wire harness is installed on a vehicle body by mounting the clamp at required portions and flexibly (contractedly) inserting a locking blade of the clamp into an installing hole formed on the body panel so that the wire harness can be wired along predetermined paths. Thereafter, the locking blade is restored to its original state to lock the clamp to the inner peripheral edge of the installing hole.

A band clamp and a substrate type clamp are known. In the band clamp, a band is wound around a wire harness and fastened thereto, and a locking blade is projected from a band body. In the substrate type clamp, a locking blade is projected from a substrate fixed to a wire harness by winding a tape around the wire harness. In addition, as shown in FIG. 6, there is a case where a clamp 2 made of polypropylene is installed at a front end of a harness-inserted grommet 1, thereby installing the grommet 1 on a body panel by the use of the clamp 2.

As shown in FIGS. 7A and 7B, in any type of clamp that is installed on the grommet 1, whether it be clamp 2, the band clamp, or the substrate type clamp, a projection portion 2b projects from a substrate 2a and a pair of confronting locking blade portions 2c, 2c are turned down from the upper end of the projection portion 2b. A stepped notch is formed on each of locking blade portions 2c, 2c at its front (lower) end to form a horizontal stepped portion 2d and a locking portion 2e projecting from the inner lower end of the horizontal stepped portion 2d.

The clamp 2 is locked to the body panel P as follows: As shown in FIG. 8, the confronting locking blade portions 2c, 2c are flexibly inserted into an installing hole 3 of a body panel P. When the locking blade portions 2c, 2c exceed the installing hole 3, the locking blade portions 2c, 2c are restored to the original state and the locking portions 2e, 2e fits on the inner peripheral surface of the installing hole 3, and the horizontal stepped portions 2d, 2d are locked to the inner peripheral edge of the installing hole 3. In this manner, the clamp 2 is fixed to the body panel P.

Polypropylene is used to flex the clamp 2. When the clamp 2 is inserted into the installing hole 3, the locking blade portions 2c are flexed readily. Thus the clamp 2 can be smoothly inserted into the installing hole 3. When the clamp 2 has been fixed to the installing hole 3, the length L2 between the outer surface of one locking portion 2e and that of the other locking portion 2e is almost equal to the inner diameter L1 of the installing hole 3. The height of the frame portion 2b is about 10 mm (11 mm in the example shown in FIG. 8).

In fixedly inserting the clamp 2 into the installing hole 3 of the body panel P, it is impossible to visually check whether the locking blade portion 2c of the clamp 2 has been inserted into the installing hole 3, whether the locking portion 2e has fitted on the inner peripheral surface of the installing hole 3; and whether the horizontal stepped portion 2d has been locked to the inner peripheral edge of the installing hole 3. In the case of the band clamp and the substrate type clamp, the wire harness prevents an operator from checking whether the locking blade portion has been correctly locked to the installing hole. This is because the band clamp and the substrate type clamp are also installed on the wire harness.

As described above, the clamp 2 is made of polypropylene which is flexible and is 80-80 in Rockwell hardness, and the length L2 between the confronting locking portions 2e is almost equal to the inner diameter L1 of the installing hole 3. Therefore, an operator does not feel that the locking blade portion 2c has not flexibly returned to its original state when the clamp is inserted into the installing hole 3, and no sound is generated when the locking portion 2e fits on the installing hole 3. That is, it is impossible to check whether the clamp 2 has been installed on the body panel P.

The present invention has been made in view of the above-described problem.

SUMMARY OF THE INVENTION

Therefore, it is an object of the present invention to provide a clamp which can be installed on a body panel and allow the operator to reliably know that the clamp is secured when the clamp cannot be checked visually. This is accomplished through the generation of a sound and the ability for the operator to feel through the hands that a locking blade portion thereof has flexibly returned to its original state when the clamp is inserted into an installing hole of the body panel.

To achieve the above and other objects, the present invention provides a clamp that is locked to a body panel by inserting a flexible locking blade portion thereof into an installing hole and utilizing a return of the locking blade portion to an original state thereof when the locking blade portion exceeds the installing hole. The clamp comprises a resinous material having Rockwell hardness at 100 or more and 150 or less and molded by one-piece molding. When the clamp fits on the body panel, a fit-on sound and consciousness of a return of the locking blade portion to the original state are generated.

The clamp is made of resin having a Rockwell hardness at 100–150, higher than conventional polypropylene having a flexibility of about 80. Thus, when the locking blade portion exceeds the installing hole of the body panel and returns to its original state in an operation of installing the clamp into the installing hole, a loud sound is generated by the fitting of a locking portion of the clamp projecting from the locking blade portion on the installing hole. Thus, the operator hears a fit-on sound, thus confirming the completion of the installation of the clamp on the body panel through the ears. Further, the operator feels that the hard and long locking blade portion has returned flexibly to the original state. Accordingly, the operator can confirm through the hands that the clamp has been fitted into the installing hole of the body panel.

In the clamp, an increase of an insertion force that is generated by increasing a hardness of the clamp is offset by increasing a height of a projection portion from a substrate portion and decreasing an angle of the locking blade portion formed by turning down a front end of the projection portion to decrease a projection amount of the locking blade portion in a lateral direction thereof; and a fit-on sound is generated when the locking blade portion exceeds the installing hole and returns to the original state.

As described above, because the clamp is made of a resinous material having a high hardness, the clamp applies a great force to the installing hole of the body panel. The projection amount of the locking blade portion in a lateral direction thereof is small. Thus, in inserting the clamp into the installing hole, no friction occurs between the inner peripheral surface of the installing hole and the surface of the projecting locking blade portion. Thus, the surface of the projecting locking blade portion is not abraded. Thus, the increase of the insertion force that is generated by making the hardness of the clamp higher than the conventional clamp is offset by making the projection amount of the locking blade portion in a lateral direction thereof small. Thus, the degree of the insertion force that is applied to the installing hole of the clamp is almost equal to that of the insertion force that is applied thereto by the conventional clamp.

The clamp is made of PBT (polybutylene terephthalate) having a hardness higher than polypropylene. The material of the clamp is not limited to the PBT, but it is possible to use resin having a hardness higher than that of polypropylene conventionally used. For example, it is possible to use polypropylene having a high hardness, composite reinforced polypropylene, and the like.

BRIEF DESCRIPTION OF THE DRAWINGS

FIG. 4 is a schematic view showing a comparison between the angle between a locking blade portion of a clamp of the present invention and that of a conventional clamp and between the height of the locking blade portion of the former and that of the latter.

FIGS. 5A and 5B show a modification of a locking portion that is projectingly formed at a front end a locking blade portion of a clamp of the present invention.

DETAILED DESCRIPTION OF PREFERRED EMBODIMENTS

Embodiments of the present invention will be described below with reference to accompanied drawings.

Figure 1:
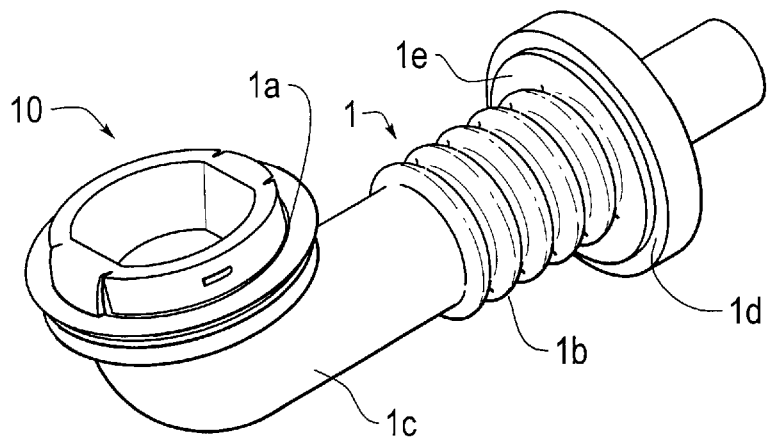
FIG. 1 is a perspective view showing a grommet on which a clamp of the present invention has been installed.
Figure 2:
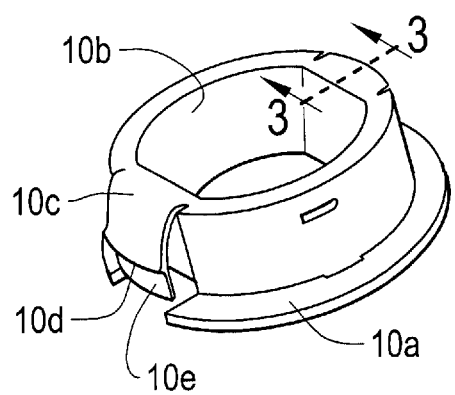
FIG. 2 is a perspective view showing the clamp shown in FIG. 1.
Figure 3:
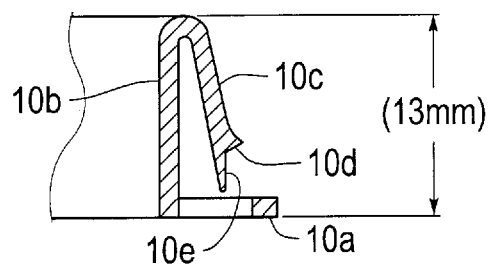
FIG. 3 is a sectional view taken along a line A—A of FIG. 2.
Figure 6:
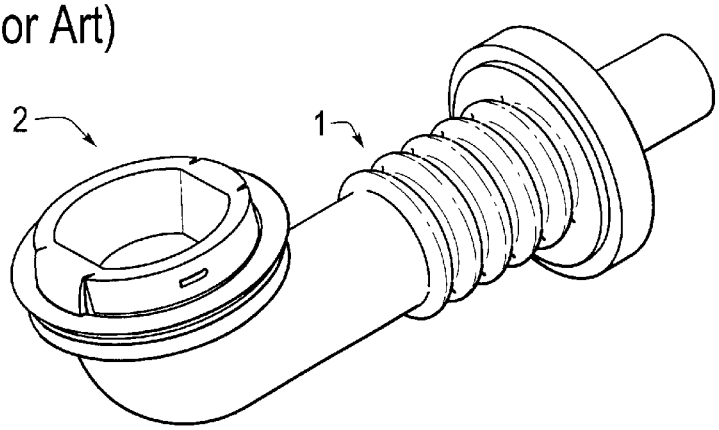
FIG. 6 is a perspective view showing a grommet on which a conventional clamp has been installed.

FIGS. 1 through 3 show an embodiment of a clamp 10 installed on a front end 1a of a grommet 1 shown in FIG. 6. A wire harness that is wired from a vehicle body side to a back door side is inserted through the grommet 1. The clamp 10 that is installed on the front end 1a of the grommet 1 is fixed to a body panel P at the vehicle body side. The grommet 1 has a bent cylindrical portion 1c including a bellows portion 1b at a portion thereof between front and rear ends thereof. At the rear end of the grommet 1, there is formed a large-diameter portion 1e on which a locking groove 1d that is fixedly inserted into an installing hole (not shown) of a door panel is formed. The grommet 1 is made of rubber or elastomer.

Figure 7A:
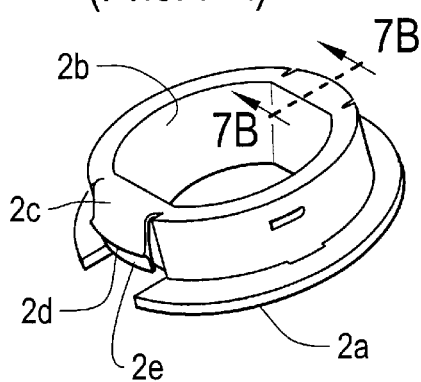
FIG. 7A is a perspective view showing the clamp shown in FIG. 6.
Figure 7B:
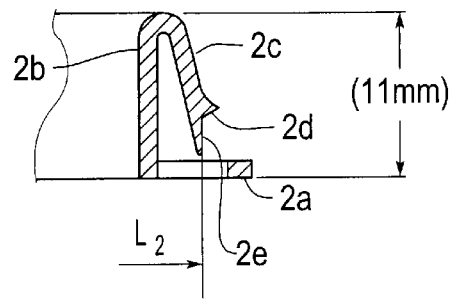
FIG. 7B is a sectional view taken along a line B—B of FIG. 6.
Figure 8:
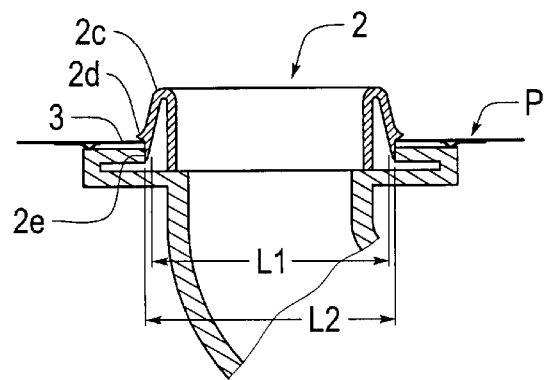
FIG. 8 is a sectional view showing a state in which the conventional clamp shown in FIG. 7 has been installed on an installing hole of a body panel.

The clamp 10 that is installed on an annular portion of the front end 1a of the grommet 1 is similar to the conventional clamp 2 shown in FIGS. 6 and 7 in its configuration, but different from that shown in FIGS. 6 and 7 in the material, the height of its frame portion, and the dimension of its confronting locking portions.

That is, the clamp 10 has an elliptic substrate 10a fixed inwardly to the annular portion of the front end 1a of the grommet 1, a frame-shaped projection portion 10b erected from the substrate 10a, and a pair of locking blade portions 10c, turned down from the upper end of the confronting portions of the projection portion 10b. A notch is formed at the lower end of each of a pair of the locking blade portions 10c, to form horizontal stepped portion 10d and a locking portion 10e projecting from the inner lower end of each of the horizontal stepped portions 10d.

The clamp 10 is made of PBT (polybutylene terephthalate) having a hardness higher than 140 or more in Rockwell hardness. The material of the clamp 10 is not limited to the PBT, but it is possible to use resin such as polypropylene, composite reinforced polypropylene, and the like each having a hardness higher than that of polypropylene whose Rockwell hardness is 70–80.

The height H of the frame-shaped projection portion 10b is greater than that of the frame-shaped projection portion 2b of the conventional clamp 2 shown in FIGS. 6 and 7 by 10%–20%. More specifically, the height of the former is 13 mm, whereas that of the latter is 11 mm. The length of the locking blade portion 10c, the horizontal stepped portion 10d, and the locking portion 10e from the substrate 10a are the same as that of the locking blade portion 2c, the horizontal stepped portion 2d, and the locking portion 2e of the conventional clamp 2. Thus, the locking blade portion 10c is longer by 2 mm than the locking blade portion 2c of the conventional clamp 2.

As shown in FIG. 4, the angle θ1 of the locking blade portion 10c that is turned down from the upper end of the frame-shaped projection portion 10b is set smaller than the angle θ2 of the locking blade portion 2c (FIG. 7) of the conventional clamp 2. More specifically, the angle θ1 is about 14°, and the angle θ2 is about 18°. Thus, the dimension L3 between the confronting locking portions 10e and 10e formed at the lower end of the confronting locking blade portions 10c, is smaller by about 0.2 mm than the inner diameter L1 of the installing hole 2 of the body panel P.

Because the clamp 10 has a higher hardness than the conventional clamp 2, the clamp 10 applies a greater insertion force to the installing hole 3 of the body panel P than the conventional clamp 2. The height of the frame-shaped projection portion 10b is larger than that of the frame-shaped projection portion 2b of the conventional clamp 2, and the angle of the locking blade portion 10c is smaller than the angle of the locking blade portion 2c of the conventional clamp 2. Thus, the increase of the insertion force that is generated by making the hardness of the clamp 10 higher than the conventional clamp 2 is offset by making the angle of the locking blade portion 10c smaller than the angle of the locking blade portion 2c of the conventional clamp 2. Thus, the degree of the insertion force that is applied to the installing hole 3 of the clamp 10 is almost equal to that of the insertion force that is applied thereto by the conventional clamp 2.

In the conventional clamp made of flexible polypropylene, the angle of the locking blade portion 2c is set large to allow the locking blade portion 2c to be flexible. In inserting the conventional clamp 2 into the installing hole 3, a great insertion force is required because the surface of the projecting locking blade portion 2c is abraded by the friction between it and the edge of the installing hole 3. On the other hand, the angle θ1 of the locking blade portion 10c is smaller than the angle θ2 of the locking blade portion 2c. Thus, the friction between the surface of the locking blade portion 10c and the edge of the installing hole 3 is smaller than that between the surface of the locking blade portion 2c and the installing hole 3. Therefore, the clamp 10 is inserted into the installing hole 3 at a smaller force than the conventional clamp 2.

When the clamp 10 is inserted into the installing hole 3, the locking blade portion 10c exceeds the installing hole 3 and flexibly returns to the original shape. As a result, the horizontal stepped portions 10d is locked to the inner peripheral edge of the installing hole 3 of the body panel 3, and the locking portion 10e contacts the inner peripheral surface of the installing hole 3. At this time, the operator hears a clicking fit-on sound because the clamp 10 is made of a hard material, whereas the conventional clamp made of soft polypropylene does not generate a clear fit-on sound. Accordingly, the operator hardly hears a fit-on sound.

When the locking blade portion 10c returns flexibly to the original state after exceeding the installing hole 3 and is locked to the inner peripheral surface of the installing hole 3, the operator feels that the locking blade portion 10c has returned flexibly to the original state. This is because the locking blade portion 10c is long and has a high hardness. Owing to this, the operator can confirm through the hands that the clamp 10 has been locked to the body panel P.

FIGS. 5A and 5B show modifications of the locking portion 10e formed at the lower end of the locking blade portion 10c of the clamp 10. The modified locking portion 10e shown in FIG. 5A has convex and concave portions. The modified locking portion 10e shown in FIG. 5B is comb tooth-shaped. When these locking portions 10e contact the inner peripheral surface of the installing hole 3, a loud sound is generated. Thus the operator can hear the click easily.

The clamp of the embodiment is installed on the grommet, but needless to say, it can be used as the band clamp and the substrate type clamp that are usually used to install the wire harness on the body panel.

As apparent from the foregoing description, a resinous material of the clamp of the present invention has a higher hardness than that of the conventional clamp. Therefore, the clamp of the present invention can make a loud clear sound when the clamp is installed on the installing hole of the body panel. Further, the operator hears a fit-on sound generated by the return of the locking blade portion to the original state. Accordingly, the operator can confirm through the hands that the clamp has been fitted into the installing hole of the body panel.

Therefore, although the operator cannot check the installation state visually whether or not the clamp has been locked to the body panel, the operator can confirm the completion of the installation of the clamp on the body panel through the sound and feeling transmitted to the operator's hand. That is, the operator can reliably install the clamp on the body panel.

What is claimed is:

1. A clamp for use with a body panel that defines an installing hole, the clamp being able to be locked to the body panel, the clamp comprising:

a substrate;

a projection portion extending from the substrate; and a flexible locking blade portion insertable into the installing hole of the body panel, the flexible locking blade portion having a resting position relative to the substrate, the flexible locking blade portion deflecting away from the resting position during insertion into the installing hole and deflecting toward the resting position after being fully inserted into the installing hole to tightly couple the clamp to the body panel;

wherein the substrate, projection portion and flexible locking portion are unitary and are molded from a resinous material having a Rockwell hardness at 100 to 150 whereby a fit-on sound is generated when the flexible locking blade portion deflects toward the resting position and an indication is provided that the clamp is securely locked to the body panel.

2. The clamp according to claim 1, wherein an angle defined between the projection portion and the flexible locking blade portion is smaller compared to a corresponding angle in a clamp having a corresponding substrate, a corresponding projection portion and a corresponding flexible locking portion that are unitary and are molded from a resinous material having a Rockwell hardness at 70 to 80.

3. The clamp according to claim 2, wherein the angle defined between the projection portion and the flexible locking blade portion is about 75% of the corresponding angle in the clamp having the corresponding substrate, the corresponding projection portion and the corresponding flexible locking portion that are unitary and are molded from the resinous material having the Rockwell hardness at 70 to 80.

4. The clamp according to claim 2, wherein the angle defined between the projection portion and the flexible locking blade portion is about 18°.

5. The clamp according to claim 1, wherein a length of extension of the projection portion from the substrate is greater than a corresponding length in a clamp having a corresponding substrate, a corresponding projection portion and a corresponding flexible locking portion that are unitary and are molded from a resinous material having a Rockwell hardness at 70 to 80.

6. The clamp according to claim 5, wherein the length of extension of the projection portion from the substrate is from 10% to 20% greater than the corresponding length in the clamp having the corresponding substrate, the corresponding projection portion and the corresponding flexible locking portion that are unitary and are molded from the resinous material having the Rockwell hardness at 70 to 80.

7. The clamp according to claim 5, wherein the length of extension of the projection portion from the substrate is about 13 mm.

* * * * *